Figure 1:
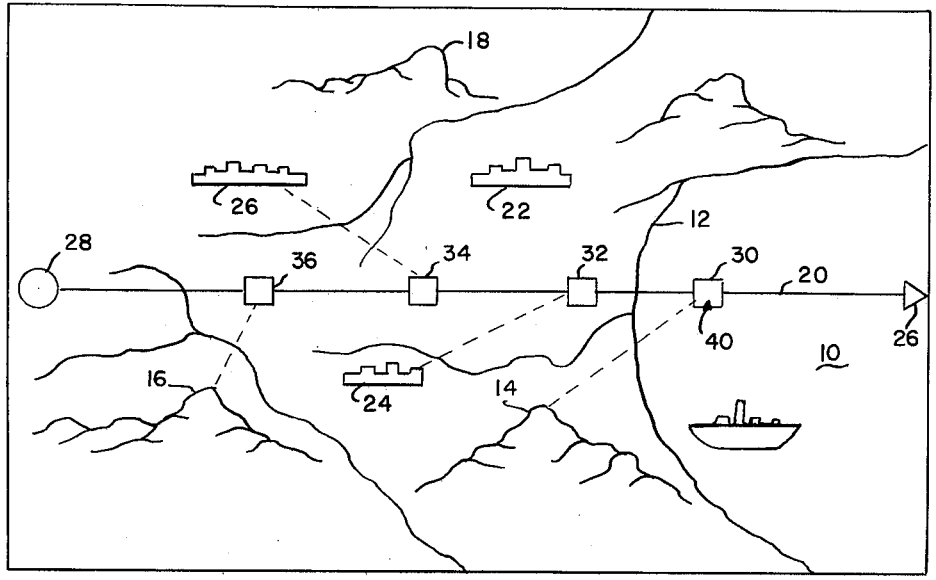

April 12, 1966   M. E. MEHRON   3,246,326
AIR-BORNE NAVIGATION SYSTEM
Filed March 29, 1960   2 Sheets-Sheet 1

INVENTOR.
MARTIN E. MEHRON
BY
ATTORNEYS

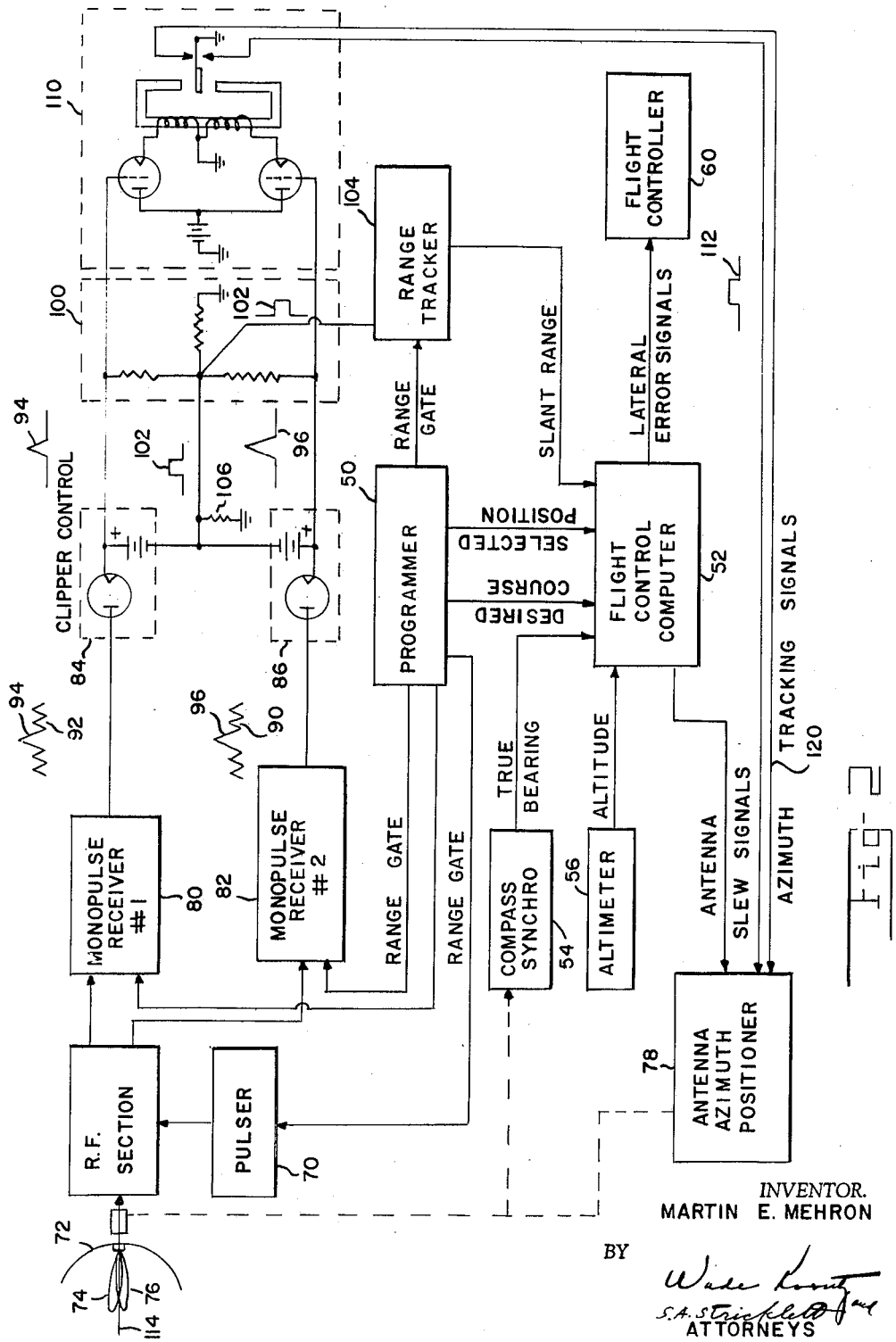

United States Patent Office 3,246,326
Patented Apr. 12, 1966

3,246,326
AIR-BORNE NAVIGATION SYSTEM
Martin E. Mehron, Nashua, N.H., assignor to the United States of America as represented by the Secretary of the Air Force
Filed Mar. 29, 1960, Ser. No. 18,455
3 Claims. (Cl. 343—7.4)

The invention described herein may be manufactured and used by or for the United States Government for governmental purposes without payment to me of any royalty thereon.

This invention relates to an air-borne navigation system and particularly to a navigation system of the tracking type having means for utilizing artificial beacons for supplying error data.

In the utilization of guided vehicles such as missiles to be delivered over long distances, considerable difficulty has been encountered in delivering the guided vehicle to the target zero. An inertial guidance system having the necessary facilities for delivering a missile onto a target has been very delicate and also very expensive and to this difficulty is added the fact that any error is cumulative so that when a missile is delivered over a long distance, such as several thousand miles, it may be several miles off target. Because of this difficulty, it has been customary to add to the inertial guidance system certain error correction systems so that a relatively inexpensive inertial guidance system may be utilized and the errors corrected periodically. Several methods have been proposed for providing this correcting error system. The most successful of these has been so-called map matching navigation in which a pioneer vehicle flies over the course and makes radar maps of the territory and the missile following the same territory utilizes the maps and matches them in order to arrive at the same target. This, of course, has been unsatisfactory in that the mapping vehicle is subject to enemy action in hostile territory and also the fact that the mapping vehicle has passed a particular way allows the enemy to concentrate protective armament along this route.

Considerable success has been accomplished when a series of beacons are established along the route to be followed. However, it is apparent that in hostile territory the beacons could either be destroyed or moved so that the missile would be delivered off course.

Those operators having radar experience are aware of the fact that certain targets have a very strong return which stand out like a "sore thumb" over the remaining returns. The present invention provides an addition to the usual guidance system utilizing these stand-out return devices as artificial or passive "beacons" which may be utilized in a guidance system. It is, therefore, only necessary to have an accurate map of the territory to be flown over, and certain stand-out or strong return targets can be selected which will be utilized as beacons by the tracking radar.

The present invention provides a radar system utilizing a pair of overlapping lobes and receiving the returns from each of the lobes then clipping the received signal to reduce the clutter or weak returns and allow only the returns from the outstanding reflecting objects to be seen. By preselecting the passive beacons and programming the line of flight of the device so that periodically the radar will be directed in the general direction of a preselected one of these passive beacons and using range gates to eliminate the possibility of returns from other positions providing strong returns, the return can be limited entirely to a return from the selected passive beacon so that the passive beacon may be utilized to determine the error of the flight direction and provide an error signal to correct the direction of the missile.

It is, accordingly, an object of the invention to provide means for the utilization of natural or passive beacons for a guidance system.

A further object of the invention is to provide a guidance system utilizing a relatively inexpensive guidance system instead of the heretofore required inertial system.

It is a further object of the invention to provide a guidance system having beacons selected without the necessity of a pioneer flight over enemy territory.

It is still another object to provide a guidance system having maximum accuracy with normal autopilot control.

It is a still further object to provide a guidance system substantially immune to electronic counter measures.

Figure 3:
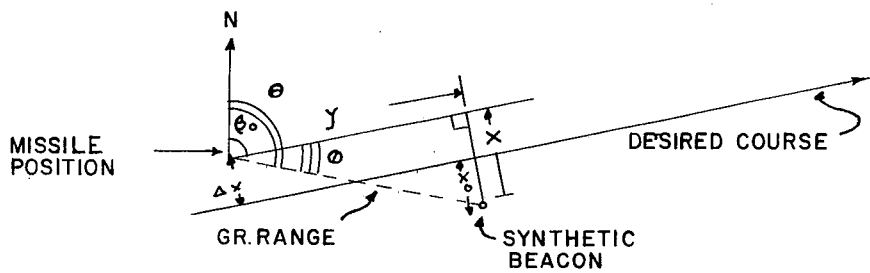

Other objects and advantages of the invention will be apparent from the following detailed description taken in conjunction with the accompanying drawings, in which:

FIG. 1 is a schematic map of a territory in a flight;
FIG. 2 is a block diagram of the simplified system according to the invention, and;
FIG. 3 is a diagrammatic illustration of the solution of the error and the method of reducing the error signal.

In the exemplary embodiment of the invention, as seen in FIG. 1, a body of water 10 is adjacent to a land mass 12 in which there are several high, outstanding mountains or peaks such as 14, 16, and 18, and outstanding locations such as cities 22, 24, and 26 which as is known produce strong radar returns.

A flight path 20 extends from a launching base 26 to a target area 28. Intermittent position areas 30, 32, 34 and 36 are indicated along the flight path 20. The position areas 30, 32, 34 and 36 are of sufficient size so that a vehicle having a relatively inexpensive guidance system will arrive in the area at a position such as 40. At the position 40 a fix will be made on some preselected outstanding target, such as 14, having a known relation to the position area, so that the flight error may be determined and the vehicle returned to course so that it will fall in the succeeding area 32. For simplicity of illustration, line 20 is shown as straight but obviously may be indirect.

The basic guidance system comprises a programmer 50 which may be of any desired type such as a magnetic drum, magnetic tape or the like. The programmer 50 may be driven in any suitable manner such as a timing motor, but preferably is driven by a motor responsive to ground speed or progress along the flight path 20 so that the programmer 50 will always operate in the proper area. The programmer 50 preferably energizes the system periodically to supply data to a flight computer 52, apply range gates and instigate operation of the radar pulser 70 and the like. The programmer 50 feeds to the computer 52 the data for each area such as the angular direction of the preselected beacon and the selected course, and also provides range gates. The range gate signals as well as the data relating each target position to the desired flight path form the only output information supplied by the programmer. Signals representing the latter information are applied to flight control computer 52 along leads which, in FIG. 2, have been assigned notations of desired course, $\beta_0$, and selected positions, i.e., the position of each target when used as the beacon. The computer 52 also receives the true bearing from a compass 54 and altitude from an altimeter 56. The computer 52 then provides a slew signal to the antenna azimuth positioner 78 which slews the monopulse antenna 72 to the angle to radiate and receive returns from the selected beacon.

The conventional radar pulser 70 connected to monopulse antenna 72 has the usual double feed displaced off center to provide a pair of overlapping lobes 74 and 76 in the horizontal plane with the center of overlap indicated by the vertical plane 114. Returns from the lobes 74 and 76 are received by the monopulse receivers 80 and 82. The outputs 90 and 92 of the receivers 80 and 82 are fed to clippers 84 and 86 such as video type bottom clippers or pick off circuits, which remove the clutter from the radar returns leaving only the strong beacon returns 94 and 96. The pulses 94 and 96 are fed to a sum channel 100 which provides the sum output pulses 102 which are fed to a range tracker 104 of a known type and also to a level control 106 so that the clipper will operate sufficiently high to remove the normal clutter from the returns.

The peaks 94 and 96, as is well known, are of different amplitude depending upon the location of the beacon with respect to the control plane 114. The peaks 94 and 96 are applied to a difference channel 110 which produces an error signal over circuit 120 to the antenna azimuth positioner 78 to correct the pointing of the antenna 72 to equalize the peaks at which time the antenna is fixed on the beacon.

The method of programming the input data is as follows: a desired flight course 20 is selected on the map and suitable radar targets, such as 14, 16, 18, 22, 24 and 26, are selected and their positions fed into the programmer with the use of magnetic tape or similar storage medium. The tracking radar uses a monopulse antenna 72 with the two usual ground pointing lobes 74 and 76 overlapping in the vertical plane 114. Plane 114 through the center of the overlap defines the bearing angle of the selected target on which the radar is taking a fix. Slant range to the target is obtained by feeding the output of the sum channel 100 into a conventional range tracker 104 which employs standard fire control radar techniques. The slant range from tracker 104 is fed into computer 52 where it is combined with altitude information from a radio or echo altimeter 56 to derive ground ranges.

The range and bearing information are converted into off-course and along-course components as shown in FIG. 3. The angle $\beta_0$ is a true angle of the desired flight course. $\theta$ is the angle of the selected target or beacon as measured by the radar. $\phi$ is the difference between $\theta$ and $\beta_0$, and it is the actual angle used in the computations as follows and GR is the ground range:

$GR \sin \phi = X =$ off-course component
$GR \cos \phi = Y =$ along-course component.

For any one target or beacon, the correct X component, designated by $X_0$, is constant, despite movement of the aircraft. Therefore, the only flight correction required is to compare X with $X_0$ and apply an error signal to the flight controller 60 to make X equal to $X_0$. The Y component is measured continuously to determine the longitudinal position of the aircraft along the course and to slew the antenna 72 to the next target at the programmed flight position.

In the operation of the system, according to the invention, the vehicle containing the programmed flight is launched from the base 26 along the flight path 20 and, at the time of launching, the programmer 50 will start operating so that when the vehicle arrives in the area 30, data will be supplied from the programmer to the flight control computer 52 which will supply an impulse to the antenna azimuth positioner 78 to slew the antenna 72 in the general direction of the artificial beacon such as mountain 14. The programmer will, at the same time, apply range gates to the receivers 80 and 82 and the range tracker 104. The range gates then limit the returns to a time to receive the turns to the selected artificial beacon so that the returns 90 and 92 will show the outstanding peaks 94 and 96 which will indicate that the lobes 74 and 76 have encountered the selected beacon. The returns from receivers 80 and 82 will pass through the clippers 84 and 86 to provide the peaks 94 and 96, which will be combined in the sum channel 100 to actuate the range tracker 104, which will supply the slant range distance to the computer 52, which will combine it with the altitude from the altimeter, to provide the ground distance to the beacon in known manner. At the same time, the peaks 94 and 96 will be supplied to the difference channel 110 to provide the output 112 which will be applied to the azimuth positioner 78 to bring the plane 114 directly onto the beacon 14 to measure the angle $\theta$ so that the flight control computer 52 will supply the proper error signal to bring $X_0$ and X into coincidence. After the determination of the error signal, the radar will be turned off until the vehicle is in the next area, such as 32, after which the fix taking and course correction will be repeated.

It will be understood that flight control computer 52 is of any suitable type well known in the art and, preferably, is a universal airborne computer capable of integrating information derived from bearing distance and heading with a programmed desired flight path. This integration permits in-flight course corrections which cause the airborne vehicle to steer toward the desired destination. Suitable examples of airborne navigational computers having characteristics readily suiting them to act in the capacity of a flight control computer are described in the 1958 National Conference Proceedings of the Dayton Section and Professional Group on Aeronautical and Navigational Electronics, IRE, pages 271 and 395. The subject matter of the referenced articles illustrates techniques and general principles applicable to the analysis and solution of general navigational and flight control problems and is sufficiently definite to disclose to those skilled in the art the manner in which the flight control computer embodied in the invention may be practiced.

It will thus be seen that the present invention provides the utilization of natural outstanding radar return objects as artificial beacons to provide correction errors for a navigation system so that a relatively inexpensive guidance system may be utilized to direct a vehicle to true contact with a distant target.

For purposes of exemplification, a particular embodiment of the invention has been shown and described according to the best present understanding thereof. However, it will be apparent to those skilled in the art that various changes and modifications in the construction arrangement of the parts thereof may be resorted to without departing from the true spirit and scope of the invention.

I claim:

1. In an air-borne guidance system utilizing objects producing strong radar return signals as passive beacons and having a preset programmer monitoring operation of the system for controlling the flow of data specifying the loctaion of said objects and a desired flight course to a control computer which controls the operation of a flight controller, an error detecting system comprising an antenna, a radar pulser connected to said antenna, said antenna providing overlapping search lobes, positioning means controlled by said computer for aiming said antenna in a preselected direction, a receiver for each of said lobes, a clipper in series with each of said receivers, a sum channel connected to receive clipped outputs of said receivers, a range tracker, connections for applying the output of said sum channel to said range tracker, said range tracker supplying a slant range signal to said computer, a difference channel controlled by the clipped outputs of said receivers, circuit means applying the output of said difference channel to said positioning means to correct the aim of said antenna at said passive beacon.

2. For use with a guidance system having a flight controller for controlling the flight path of a vehicle by taking radar fixes on prominent ground objects located along said flight path, a flight control computer controlling the flight controller and receiving data describing the positions of said objects from a predetermined flight plan programmer and also bearing and altitude data from a compass and an altimeter, an error signal producing system comprising a radar pulser monopulse antenna having beams overlapping in the horizontal direction, an antenna positioner controlled by said computer in response to signals from said programmer to a direction approximately that of a preselected object, a monopulse receiver for each of said beams, a clipper connected to remove weak radar returns from each of said receivers, a sum channel connected to receive the outputs of said clippers for providing a sum of the strong returns from said beams, circuit means applying the output of said sum channel to said clippers to determine the clipping level, a difference channel receiving the strong return signals to provide a difference signal, means to apply the difference signal to said antenna positioner to point the antenna directly at said preselected target.

3. For use with a guidance system having a programmer carrying a preselected flight program including data describing the locations of preselected objects relative to a desired flight path, a flight control computer receiving said data from said programmer, means for applying compass bearing data to said computer, a connection for applying altitude data to said computer, a flight controller connected to receive control signals from said computer, an error detecting system comprising, a monopulse antenna, a radar pulser connected to said antenna, said antenna providing horizontally overlapping search lobes, positioning means operative to point said antenna in a preselected direction to receive returns from a preselected object, monopulse receivers for the returns from each lobe, connections to apply gate signals from said programmer to said receivers, a clipper removing the weak return signals from each receiver output, a summation channel fed by the outputs of said clippers, a range tracker, connections for applying the output of said summation channel to said range trackers, means for connecting the output of said range tracker to said computer, a difference channel connected to the outputs of said clippers, connections for applying the output of said difference channel to said positioning means for aiming said antenna at said preselected object.

References Cited by the Examiner

UNITED STATES PATENTS

| | | | |
|---|---|---|---|
| 2,710,962 | 6/1955 | Fritze | 343—112 |
| 2,776,099 | 1/1957 | Perrill | 343—112 |
| 2,943,321 | 6/1960 | Karpeles | 343—112 |

CHESTER L. JUSTUS, *Primary Examiner.*

FREDERICK M. STRADER, KATHLEEN CLAFFY,
*Examiners.*

M. A. MORRISON, P. M. HINDERSTEIN,
*Assistant Examiners.*